United States Patent
Jones et al.

[11] 3,902,995
[45] Sept. 2, 1975

[54] FLOW CONTROL AND SCREENING DEVICE FOR A HOPPER

[75] Inventors: Robert D. Jones; Jerry L. Hall, both of Oskaloosa, Iowa

[73] Assignee: Intraco, Inc., Oskaloosa, Iowa

[22] Filed: Feb. 19, 1974

[21] Appl. No.: 443,229

[52] U.S. Cl. .............. 209/240; 209/257; 209/393; 222/328
[51] Int. Cl. .............................................. B07b 1/00
[58] Field of Search .......... 209/240, 244, 393, 243, 209/257, 245, 236, 275, 269; 222/328

[56] References Cited
UNITED STATES PATENTS

| | | | |
|---|---|---|---|
| 841,894 | 1/1907 | Quirk | 209/240 |
| 1,629,244 | 5/1927 | Willcox | 209/240 X |
| 1,737,383 | 11/1929 | Nickerson | 209/240 UX |
| 2,412,425 | 12/1946 | Rawson | 209/240 |
| 2,726,079 | 12/1955 | Sheets | 209/236 X |
| 3,254,766 | 6/1966 | Anderson | 209/245 |
| 3,288,287 | 11/1966 | Rhodes | 209/257 |

FOREIGN PATENTS OR APPLICATIONS

| | | | |
|---|---|---|---|
| 382,873 | 11/1932 | United Kingdom | 222/328 |
| 646,128 | 8/1902 | Canada | 222/328 |
| 1,264,698 | 5/1961 | France | 209/275 |
| 916,249 | 1/1963 | United Kingdom | 222/328 |

*Primary Examiner*—Robert Halper
*Attorney, Agent, or Firm*—Henderson & Strom

[57] ABSTRACT

A closed system for handling and moving materials. A tube in the system has a continuous feed cable therein with uniformly spaced plastic discs disposed rigidly along the cable. The disc diameter is approximately the size of the inner diameter of the tube. A drive system is provided to axially move the cable and discs within the tube, which in turn moves the material along the tube. A hopper device is provided in the feed line circuit to selectively feed the material to be handled into the tube and thereby into the closed system. The hopper has a large opening at the top thereof with three tapering sides and a straight front side leading to an opening at the bottom of the hopper. A screening device of a novel configuration is interposed between the opening in the bottom of the hopper and an adjustable opening into the tube conveyor line. An electrical vibrator device is connected to the screening device and serves to vibrate the screening device, but not the hopper itself.

6 Claims, 3 Drawing Figures

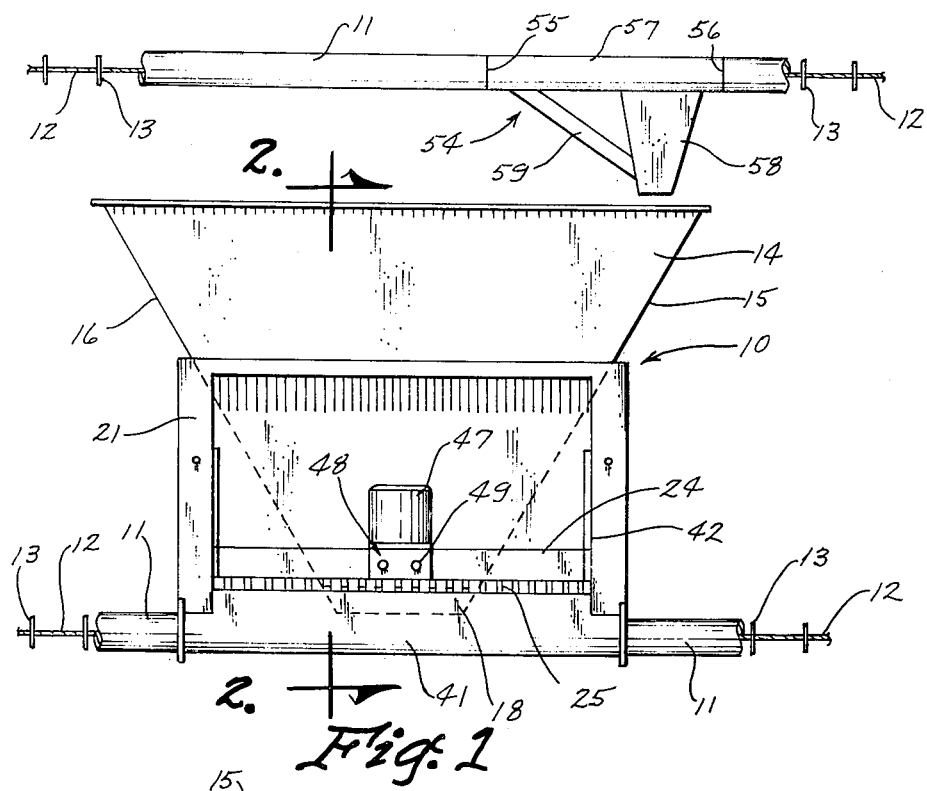
Fig. 1
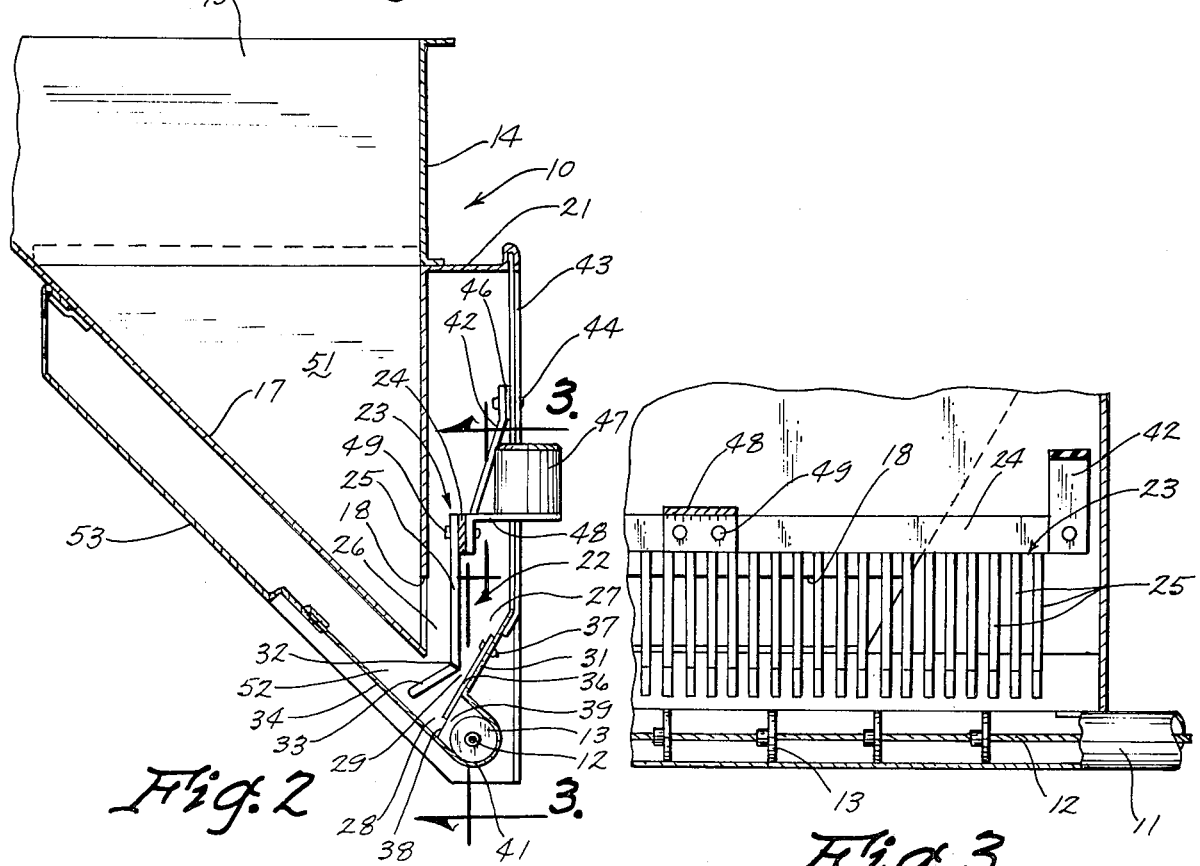
Fig. 2
Fig. 3

FLOW CONTROL AND SCREENING DEVICE FOR A HOPPER

BACKGROUND OF THE INVENTION

The present invention relates generally to a materials handling and transporting conveyor system, and more particularly to a remote hopper for selectively introducing material into the conveyor system.

One of the most critical problems in material handling systems of this general type, has been the one of controlling the flow of materials into the system. This is particularly true when the material is a small granular or powdery substance which has a tendency to pack or "dam" under certain conditions such as when the flow is stopped momentarily. Such a substance to be handled may typically be ground livestock or poultry feed having a grain base such as corn.

This problem of controlling the flow of powdery or granular material becomes more difficult when a large source of material must pass through a small opening, for example in a situation wherein only a small flow is needed. Another problem has been the one of preventing the material from packing or damming in the hopper itself, such that flow of the material is prevented. This problem of packing of the material in the hopper has been solved by providing oscillating members within the main hopper chamber for example as shown by U.S. Pat. No. 2,940,424. One disadvantage of this general type of agitating system is that the drive apparatus must be physically located beside the hopper because the drive wheel operates the oscillating mechanism.

Another problem has been the one of screening out undesirably large particles from the material entering the conveyor system, without causing a flow stoppage. This problem is a critical one when handling granular or powdery substances since if the flow of material is inhibited enough by large particles caught on the screen in the path of material flow, the damming phenomenon referred to above will occur.

SUMMARY OF THE INVENTION

The present invention relates to a means for controlling the flow of powdery or granular materials which tend to stick together or dam, by utilizing this natural tendency of such materials. A selectively vibrated screen is so positioned in a hopper device, such that when the screen is vibrated, the material to be handled will flow. When the screen vibration is terminated, the material does not flow because of the damming effect. The configuration of the screen is such that a trap is formed to catch large pieces of foreign matter which might damage the system. However, the screen is positioned such that material which is too large to pass through the screen gravitates to a position where it can be easily removed, and where it does not inhibit the operation of the flow control structure. A resilient coupling connects the vibrator screen to the hopper such that the screen is vibrated, but the hopper is not.

An object of the present invention is to selectively control the flow of a powdery or granular material.

Another object of the present invention is to selectively form a dam of powdery or granular material to be handled so as to selectively stop the flow of the material.

A further object of the invention is to provide a screening device which does not interfere with the flow control mechanism.

Still another object is to prevent the packing of powdery or granular material in the main chamber of a hopper.

A still further object of the invention is to provide a hopper which can be located at a point in the conveyor line remote from the drive apparatus.

Other objects, advantages, and novel features of the present invention will become apparent from the following detailed description of the invention when considered in conjunction with the accompanying drawings.

BRIEF DESCRIPTION OF THE DRAWINGS

FIG. 1 is a front elevation view of the hopper of the present invention;

FIG. 2 is a cross-sectional view of the hopper taken along lines 2—2 of FIG. 1; and FIG. 3 is a partial cross-sectional view taken along line 3—3 of FIG. 2.

DESCRIPTION OF THE PREFERRED EMBODIMENT

Referring now to the drawings wherein like reference numerals designate identical or corresponding parts throughout the several views, FIG. 1 shows a hopper 10 which is part of a transport conveyor system having a tube 11 which forms a circuit leading to and from the hopper 10. Within the tube 11 is disposed a continuous cable 12 having plastic disc members 13 rigidly affixed thereto. A drive apparatus (not shown) is provided for moving the cable and discs along the inside of the tube. Such a drive apparatus may be of the type shown in copending Ser. No. 434,768. The hopper 10 is operatively connected to the conveyor line tube 11 for selectively introducing materials from the hopper into the conveyor line tube 11.

A container for receiving the material to be handled is formed by side walls 14, 15, 16 and 17. Wall 14 is straight and vertical (FIG. 2) and has an opening 18 in the bottom thereof. Walls 15, 16 and 17 slope downwardly towards the opening 18 in vertical wall 14, such that materials within the container will tend to naturally move towards and out of opening 18. The fact that the front wall 14 is straight has a tendency to prevent the material within the container from causing a flow stoppage towards opening 18 as is more likely with structures which have entirely sloping walls thereon. It has been found that powdery or granular materials are less likely to dam when the wall is straight and vertical than when it is sloping.

A housing 21 is connected to the container walls and generally forms a chamber 22. Resiliently attached to the housing 21 is a screen device 23 for screening materials passing through opening 18. The screening device 23 is comprised of a horizontally disposed bar 24 to which is attached a plurality of rods 25. The rods 25 are preferably evenly spaced along the bar 24 and are welded thereto, for example as shown in FIG. 3. The rods 25 are generally vertically disposed in the chamber 22 so as to generally divide the chamber 22 vertically into a first section 26 on the left side of screen member 23 as seen in FIG. 2, and a second section consisting of an upper portion 27 and a lower portion 28 on the right side of screen member 23 as seen in FIG.

2. Upper portion 27 is separated from lower portion 28 by a small space 29 between the bars 25 and the wall 31 of the chamber 22. Wall 31 is slanted at an angle between the horizontal and the vertical and is in the closest proximity to the rods 25 at the bend 32 of rods 25. The lower portion 33 of rods 25 extend to within a close proximity of wall 34 of chamber 22 to thereby prevent large objects from passing around the screen member 23.

A plate 36 is slideably mounted on wall 31 by one or more nut and bolt devices 37. This adjustable movement feature of plate 36 provides an adjustable opening 38 at the extreme bottom of chamber 22. The opening 38 leads to another chamber 39 which is formed by a wall 41. The wall 41 and chamber 39 are counterparts to the tube 11 and form the remainder of the conveyor circuit line. Within chamber 39 is disposed a portion of the continuous cable 12 with plastic disc members 13 rigidly disposed thereon.

The mounting of the screen member 23 is accomplished by the connection bars 42 which are mounted to wall 43 of housing 21 by bolts 44. A resilient member 46 is interposed between the members 42 and the wall 43, and may be made of rubber or any other suitable resilient material. An electric vibrator 47 is connected to rod member 24 by bracket member 48 and bolts or rivets 49. The resilient mounting members 46 allow the screen to vibrate without vibrating the other portions of the hopper 10. This prevents the material in the main chamber 51 of the hopper from being packed together and thereby stopping material flow as might occur if the hopper walls 14–17 were also vibrated.

In operation, material in the hopper container chamber 51 will flow by gravity through the opening 18 and through the openings between bars 25. The material will then continue down to the bottom of chamber 22 and will tend to pass through opening 38. The powdery or granular substances such as poultry or livestock feed or industrial substances which are normally used in this system will tend to form a dam in lower section 28 especially because of the smallness of opening 38. Also because of the dam formed in lower chamber 28, this effect will back up the material and form a similar or larger dam in upper section 27 of chamber 22. This will have the additional effect of stopping the flow of material out of the chamber 51 through opening 18.

Upon energizing the vibrator 47, the dam in lower section 28 will be broken up, as will the dam in the upper section 27 of chamber 22. To the extent that material is able to flow into chamber 39 of the conveyor system, the material will then freely flow. Foreign particles which are too large to pass through the openings between bars 25 will tend to hit the bars 25 at the vertical portions of bar 25. These particles, however, will be forced downwardly by gravity and by the vibration of members 25 into the chamber 52 where they will be prevented from entering the lower section 28 because of the lower portions 33 on bars 25. These foreign objects, however, will not inhibit flow because they have moved out of the normal path of the material. These foreign objects may be easily removed from the system by removing cover 53 and manually extracting these objects.

As long as the vibrator 47 is energized, the material will continue to flow through the screen member 23 and through the opening 38, so long as there is room in chamber 39. If the conveyor system tube 11 and chamber 39 are full of material, there will, of course, be no flow from the hopper 10. However, if the conveyor system tube line 11 and chamber 39 are not full, they will be filled up so long as there is material in the chamber 51 and the vibrator 47 is energized.

If the conveyor system tube line 11 is full, the material will back up and fill chamber 22 as described above. The fact that the chamber 22 is full will then prevent any material from continuing to exit out of opening 18 so as to overfill the chamber 22. Whenever it is desired to stop the flow of materials into the conveyor system tube line 11, the vibrator 47 is deenergized and a dam immediately forms in the lower section 28 and in the upper section 27 to thereby prevent further flow out of opening 18. It can therefore be seen that this hopper device provides an important and easily controllable selective flow function. A further control is provided by adjusting the opening 38 by moving the plate 36. Such an adjustment may be dictated by the particular characteristics of the material to be handled, especially with respect to the propensity of the material to form a dam.

Recirculation of the material in the conveyor system may be effected by recirculating device 54 which is pivotally mounted to the tube 11 by joints 55 and 56. A tube section 57 is of the same size as the tube 11 and has a spout 58 which is in the position shown in FIG. 1 when recirculation is desired and is moved to an upward position when no recirculation is needed. A brace 59 is provided to support the spout 58.

Obviously many modifications and variations of the present invention are possible in light of the above teachings. For example the screen member 23 may be vibrated in any suitable manner in practicing this invention, and the invention is not to be limited to the use of an electrical vibrator. It is therefore to be understood that, within the scope of the appended claims, the invention may be practiced otherwise than as specifically described.

We claim:
1. A materials handling device comprising:
a hopper having an outlet opening therein;
a chamber disposed outside of said hopper adjacent the outlet opening;
a screening means being disposed in said chamber, at least a lower portion of said screening means lying completely within said chamber, said screening means generally vertically dividing said chamber into a first and a second section, said first section being on the same side of said screening means as the outlet opening, said second section of said chamber being on the other side of said screening means and being generally formed between said screening means and a wall of the chamber, an intermediate portion of said screening means being closest to said wall of the chamber to thereby divide the second section of the chamber into an upper and a lower portion, said lower portion of said second section having an opening therein, said opening lying completely on said other side of said screening means and being in direct communication with a enclosed conveyor means;
means connected to said screening means for vibrating said screening means whereby when said screening means is vibrated, material will flow from said hopper outlet opening, past said screening means into the top portion, from the top portion to the lower portion, and from the lower portion through the lower portion opening;

means for moving material which is too large to pass through said screening means out of the main flow path of the material; and trap means for holding said material which is too large to pass through said screening means out of the main flow path.

2. The materials handling device as defined in claim 1 including means for adjusting the size of the opening in said lower portion of the chamber.

3. The materials handling device as defined in claim 1 wherein said wall of the chamber is positioned at an angle between vertical and horizontal.

4. The materials handling device as defined in claim 1 wherein said screening means is straight and vertical with a non-vertical bend on one end thereof.

5. The materials handling device as defined in claim 1 wherein said screening means comprises a series of spaced rods connected together.

6. The materials handling device as defined in claim 1 wherein said screening means is resiliently mounted to said hopper to thereby prevent vibration of the hopper.

* * * * *